May 10, 1966 M. PACHUTA 3,250,230
CARRIER TRANSFER DEVICE FOR CONVEYOR POWER LINES
Filed July 9, 1964 2 Sheets-Sheet 1

INVENTOR.
MARTIN PACHUTA
BY Farley, Forster and Farley
ATTORNEYS

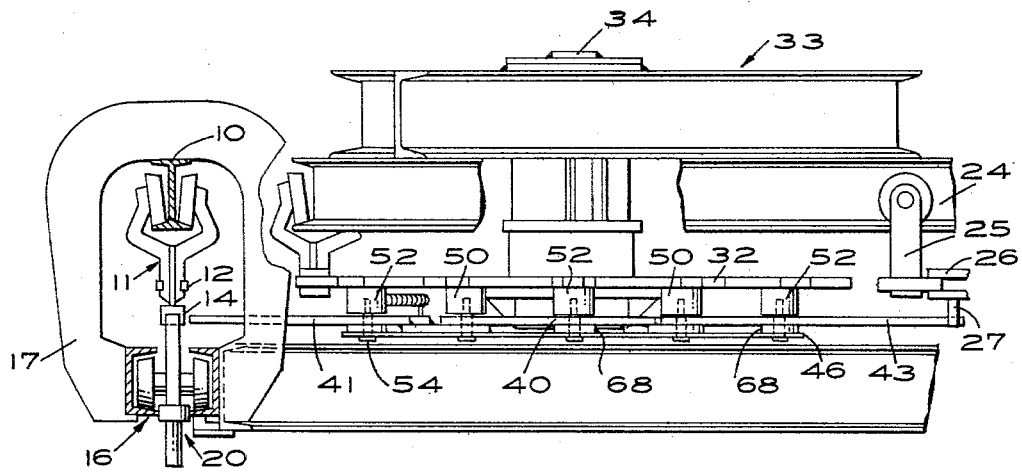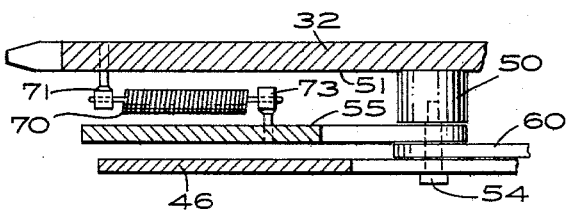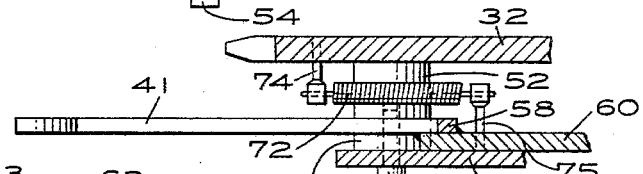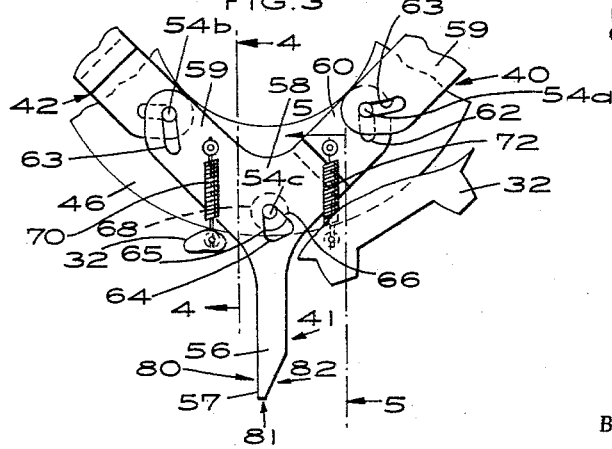
INVENTOR.
MARTIN PACHUTA
BY Farley, Forster and Farley
ATTORNEYS United States Patent Office 3,250,230
Patented May 10, 1966

3,250,230
CARRIER TRANSFER DEVICE FOR
CONVEYOR POWER LINES
Martin Pachuta, Allen Park, Mich., assignor to Jervis B. Webb Company, Detroit, Mich., a corporation of Michigan
Filed July 9, 1964, Ser. No. 381,389
7 Claims. (Cl. 104—96)

This invention relates to an improved construction for a rotatable transfer arm device which engages and propels the driven member of a conveyor carrier through a transfer zone between a forwarding pusher line and a receiving pusher line of a power and free conveyor.

The general object of the invention is to provide a device of this type in which the transfer arm is capable of moving from a driving to a non-driving position under all possible types of jamming conditions so that a carrier may be propelled through a transfer zone by the transfer arm from the pusher of a forwarding power line to the pusher of a receiving power line without the necessity of synchronizing either the rates of movement of the two power lines or the relative positions of pushers thereon.

When a carrier is transferred between non-synchronized power lines, a jamming condition can readily arise when the driven member of the carrier and the transfer arm of the transfer device move into engagement. Such a jamming condition may be caused by the transfer arm engaging the side face rather than the driving face of the driven member, or by the carrier moving at a faster rate than the transfer arm or a possible combination of both of these factors. Any of these conditions are taken care of by the present invention which permits the transfer arm to move inwardly to a non-driving position in the event of a side jamming condition, or to pivot forwardly to a non-driving position in a case where the transfer arm is engaged by a faster moving carrier, or which permits a simultaneous combination of such movements of the transfer arm.

Preferably the transfer arm is employed in conjunction with a rotating member, such as a sprocket, driven by the endless chain of one of the power lines, and the invention is characterized by means connecting the transfer arm to the rotating member for movement from a driving position to a non-driving position inwardly toward the center of rotation and pivotally in the direction of driving rotation, together with means resiliently holding the transfer arm in driving position.

The foregoing and other features and advantages of the invention will be further discussed in the following description of the presently preferred representative embodiment disclosed in the accompanying drawings which consist of the following views:

FIGURE 2 is a sectional elevation taken as indicated by the line 2—2 of FIG. 1;

Figure 1:
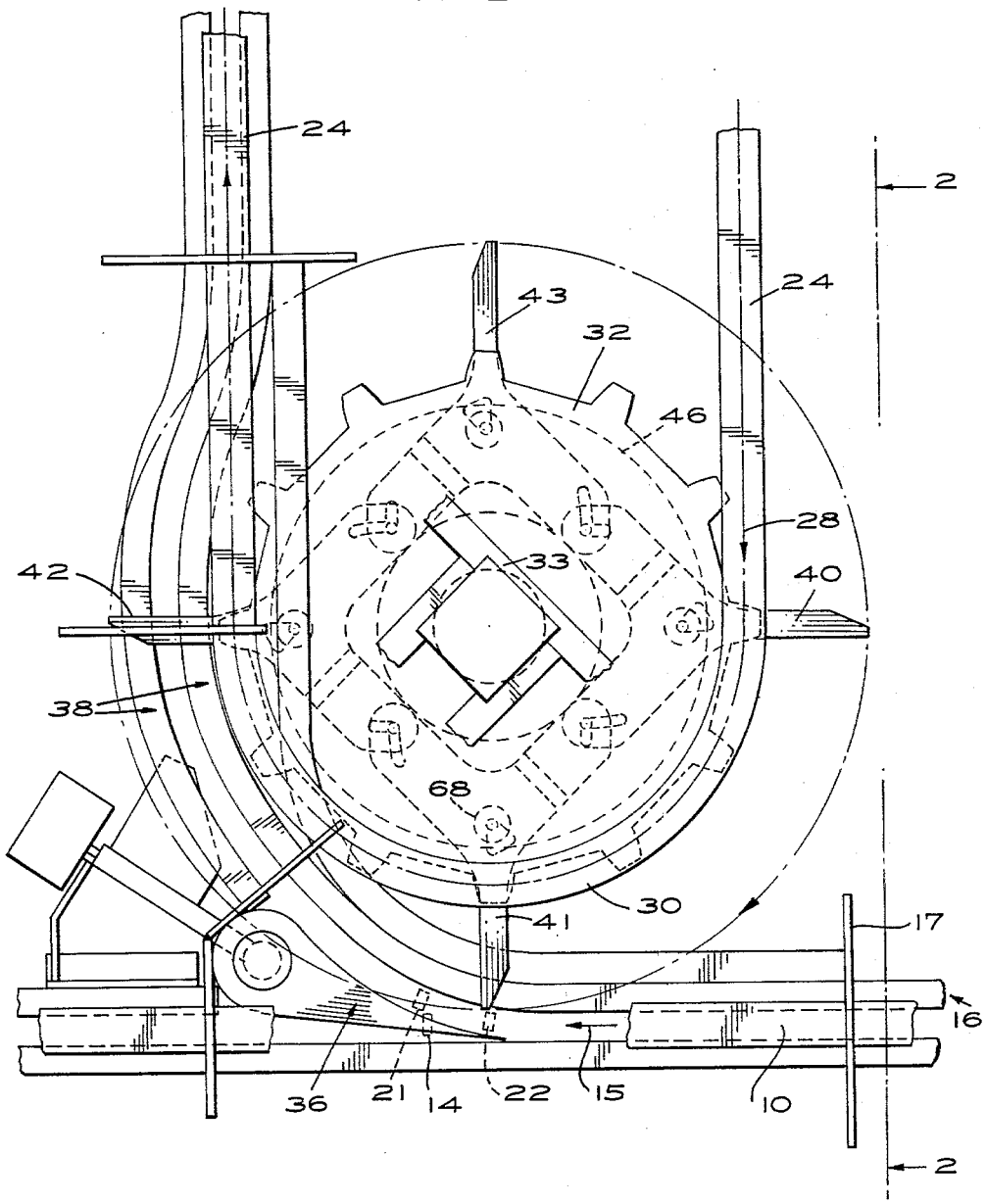
FIGURE 1 is a plan view of a transfer zone between main and branch lines of a power and free conveyor with a transfer device of the invention installed for forwarding a diverted carrier from main to branch power line.

FIGURE 3 is a fragmentary plan view showing the mounting of one of the transfer arms with the sprocket being broken away for clarity of illustration; and FIGURES 4 and 5 are respectively enlarged sectional elevations taken as indicated by the lines 4—4 and 5—5 of FIG. 3.

Referring to FIGS. 1 and 2, a main or forwarding power line consists of an I-beam track 10 supporting trolleys 11 connected to an endless chain 12 equipped with pushers 14 travelling in the direction of the arrow 15. A double-channel load track 16 is suspended beneath the track 10 by hangers 17 and supports carriers 20 equipped with a conventional pair of driving and holdback dogs 21 and 22.

A branch or receiving power line consists of an I-beam track 24 supporting trolleys 25 secured to an endless chain 26 equipped with pushers 27 travelling in the direction of the arrow 28 through a 180 degree curve 30. A sprocket 32 is rotatably supported on suitable frame structure 33 for rotation on an axis 34 at the center of the curve 30 and the sprocket engages and is driven by the chain 26 as shown in FIG. 2.

A conventional switch 36 is installed in the load track 16 for selectively diverting a carrier onto a transfer track section 38 which extends through the transfer zone around the sprocket 32 and merges into vertically aligned relation with the receiving power track 24 as shown in FIG. 1. A carrier diverted onto the transfer track 38 by the switch 36 has its driving dog 21 move laterally out of engagement with a pusher 14 of the forwarding power line as shown in FIG. 1 and is then propelled into position for engagement by a pusher of the receiving power line 24 by the transfer device of the invention.

This transfer device consists of four transfer arms 40, 41, 42 and 43 each independently slidably and pivotally mounted between the sprocket 32 and an annular plate or retainer ring 46 suspended from the sprocket in spaced relation with the lower face thereof. Four bosses 50 are secured to the lower face 51 of the sprocket 32 equally spaced radially from the center of the sprocket axis 34; and, four similar bosses 52 are also provided on the lower face of the sprocket, each of the bosses 52 being positioned intermediate an adjacent pair of bosses 50 but at a greater radial spacing from the sprocket center. The retainer ring 46 is suspended below the sprocket by shoulder screws 54 engaging all of the bosses 50 and 52.

Each of the transfer arms 40–43 is generally Y-shaped in plan as shown in FIG. 3 and includes an outer arm 56, having a driving face 57, and an integral base portion 58 having a pair of inner arms 59 and 60 extending to either side of the outer arm 56; the inner arm 60 being offset below the inner arm 59 as best shown in FIGS. 4 and 5.

Inner and outer pin and slot connections secure each transfer arm between the upper face of the retainer ring 46 and lower face of the bosses 50 and 52, the shoulder screws 54 serving as the pins for these connections as illustrated by the shoulder screws 54a, 54b and 54c in FIG. 3. Shoulder screw 54a engages a slot 62 formed in the inner offset arm 60 of the transfer arm 41, this slot 62 extending parallel to the outer arm 56. Shoulder screw 54b engages a slot 63 formed in the inner arm 59 of the transfer arm 41 and this slot 63 is arcuate to the center of the shoulder screw 54a when the transfer arm 41 is in the position shown in FIG. 3. Shoulder screw 54c engages a triangular slot 64 at the base of the outer arm 56 of the transfer arm 41, this slot 64 having one face 65 which extends parallel to the driving face 57 of the transfer arm and a second face 66 which is substantially arcuate to the center of the shoulder screw 54a. A spacer 68 is employed on the shoulder screw 54c between the upper face of the retainer ring 46 and lower face of the transfer arm 41.

This pin and slot connection is duplicated for each of the other transfer arms 40, 42 and 43; and, as shown in FIG. 3, when all transfer arms are mounted between the retainer ring 46 and sprocket 32, the inner portion 59 of one transfer arm overlaps the inner portion 60 of the next transfer arm and a shoulder screw 54a engages the slot 63 of one transfer arm and the slot 62 of the next transfer arm. A pair of springs 70 and 72 are employed to bias each transfer arm to a normal driving position; spring 70, as shown in FIG. 4, is mounted between a lug 71 secured to the lower face of the sprocket 32 and a lug 73 secured to the upper face of the transfer arm portion 59; spring 72 is secured to a lug 74 depending from the sprocket 32 and a lug 75 mounted on the offset inner arm 60 of each transfer arm.

When a transfer arm is in normal driving position as shown by the arm 41 in FIG. 3, and is in engagement with the driving dog 21 of a carrier, the driving reaction upon the transfer arm is indicated by the arrow 80 in FIG. 3, and this reaction is absorbed by the shoulder screws 54b and 54c. In the event a transfer arm engages the side of a driving or holdback dog of a carrier, producing a reaction on the transfer arm indicated by the arrow 81 in FIG. 3, the transfer arm is free to move in toward the center of rotation of the sprocket and retainer ring to a non-driving position. If a transfer arm were engaged by a faster moving carrier holdback dog 22, producing a reaction in the direction indicated by the arrow 82 of FIG. 3, the transfer arm is free to pivot about the shoulder screw 54a in the direction of driving rotation to a non-driving position. Sufficient side clearance is provided between each shoulder screw and the transfer arm slot which it engages to permit the inward and pivotal movements of the transfer arm to non-driving positions to take place in combination.

Those skilled in this art will appreciate that the structure described herein is representative. Conditions encountered in a particular conveyor installation may require a greater or a lesser number of transfer arms at a particular transfer zone. Also, the invention is equally applicable to floor truck tow line types of conveyors as pointed out in the patent of Walter C. Etheridge, No. 3,196,807. Such modifications, together with any others within the scope of the following claims are to be considered a part of the present invention.

I claim:

1. A transfer arm device for engaging and propelling the driven member of a conveyor carrier through a transfer zone from a forwarding pusher line to a receiving pusher line and including a rotating member mounted at the transfer zone and driven from one of the pusher lines, characterized by means connecting the transfer arm to the rotating member for movement from a driving position to a non-driving position inwardly toward the center of rotation of said member and pivotally in the direction of driving rotation thereof, and means resiliently holding the transfer arm in driving position.

2. A transfer arm device as claimed in claim 1 wherein the means connecting the transfer arm to the rotating member comprise an inner and an outer pin and slot connection, the outer connection permitting the said pivotal movement of the transfer arm about the inner connection from a driving to a non-driving position.

3. A transfer arm device as claimed in claim 1 wherein the means connecting the transfer arm to the rotating member includes a retainer plate, means connecting the retainer plate to the rotating member in axially spaced relation therefrom, and means pivotally and slidably mounting the transfer arm between the retainer plate and rotating member.

4. A transfer arm device as claimed in claim 1 further characterized by the transfer arm having an outer end with a driving face for engaging a carrier driven member and an inner portion, and wherein the means connecting the transfer arm to the rotating member comprises outer and inner pin and slot connections, each of said pin and slot connections including portions extending parallel to said driving face for permitting movement of the transfer arm inwardly toward the center of rotation to a non-driving position, and one of said pin and slot connections including a portion for permitting said pivotal movement of the transfer arm about the other of said pin and slot connections to a non-driving position.

5. A transfer arm device as claimed in claim 1 further characterized by the transfer arm having an outer end with a driving face for engaging a carrier driven member and an inner end having portions extending to either side of the outer end, and wherein the means connecting the transfer arm to the rotating member comprises a first pin and slot connection engaging the inner end portion of the transfer arm on the side opposite the driving face thereof for permitting movement of the transfer arm from a driving position to a non-driving position in a direction generally parallel to said driving face, a second pin and slot connection engaging the inner end portion of the transfer arm on the other side of the driving face thereof, said second pin and slot connection permitting said movement of the transfer arm on the first pin and slot connection and permitting pivotal movement of the transfer arm in the direction of driving rotation about the first pin and slot connection from a driving position to a non-driving position, and a third pin and slot connection between the transfer arm and rotating member located intermediate said first two pin and slot connections and radially outwardly thereof with reference to the center of rotation, said third pin and slot connection permitting said movements of the transfer arm and preventing movement of the transfer arm in a direction opposite to the direction of driving rotation.

6. A rotatable sprocket and transfer arm device for engaging and propelling the driven member of a conveyor carrier through a transfer zone between a forwarding pusher line and a receiving pusher line, the sprocket being rotatably mounted adjacent the transfer zone and driven by one of the pusher lines, characterized by:

(a) a retainer plate secured to one face of the sprocket in spaced relation therewith;

(b) a plurality of transfer arms each having an outer end with a driving face for engaging a carrier driven member and an inner end having portions extending to either side of the outer end, one portion on the inner end of each transfer arm trailing the driving face and the other portion on the inner end leading the driving face with reference to the normal direction of driving rotation;

(c) means mounting the transfer arms between the retainer plate and sprocket with the outer ends of the transfer arms projecting radially outward of the sprocket and spaced circumferentially around the center of rotation thereof, said mounting means comprising (i) a first pin and slot connection engaging the trailing portion on the inner end of each transfer arm permitting inward movement of each transfer arm towards the center of rotation from a driving position to a non-driving position, (ii) a second pin and slot connection engaging the leading portion on the inner end of each transfer arm permitting said inward movement and pivotal movement of the transfer arm about the first pin and slot connection in the direction of driving rotation from a driving position to a non-driving position, and (iii) a third pin and slot connection engaging each transfer arm intermediate said first and second pin and slot connections and radially outwardly thereof with reference to the center of rotation for preventing movement of the transfer arm in a direction opposite to the direction of driving rotation while permitting said inward and pivotal movements from driving to non-driving position, and (d) means biasing each transfer arm to driving position.

7. A transfer arm device as claimed in claim 6 wherein one arm on the inner end of each transfer arm is offset from the plane of the other arm on the inner end thereof, said first and second pin and slot connections each engaging a leading portion on the inner end of one transfer arm and an overlapping trailing portion on the inner end of an immediately adjacent transfer arm.

References Cited by the Examiner

UNITED STATES PATENTS 2,875,704  3/1959  Yates _____ 104—96
3,196,807  7/1965  Etheridge _____ 104—172

ARTHUR L. LA POINT, *Primary Examiner.*

F. W. MONAGHAN, *Assistant Examiner.*